United States Patent
Miller et al.

(10) Patent No.: US 10,677,168 B2
(45) Date of Patent: Jun. 9, 2020

(54) SEAL RETENTION ASSEMBLY FOR GAS TURBINE ENGINE

(71) Applicant: United Technologies Corporation, Farmington, CT (US)

(72) Inventors: Jonathan Logan Miller, Ware, MA (US); Michael M. Davis, North Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 183 days.

(21) Appl. No.: 15/840,458

(22) Filed: Dec. 13, 2017

(65) Prior Publication Data
US 2019/0178166 A1  Jun. 13, 2019

(51) Int. Cl.
| F02C 7/28 | (2006.01) |
| F01D 11/00 | (2006.01) |
| F01D 25/16 | (2006.01) |
| F16J 15/06 | (2006.01) |
| F02C 3/14 | (2006.01) |
| F02C 7/06 | (2006.01) |
| F01D 25/18 | (2006.01) |

(52) U.S. Cl.
CPC .............. *F02C 7/28* (2013.01); *F01D 11/003* (2013.01); *F01D 11/005* (2013.01); *F01D 25/162* (2013.01); *F01D 25/183* (2013.01); *F02C 3/14* (2013.01); *F02C 7/06* (2013.01); *F16J 15/06* (2013.01); *F05D 2220/32* (2013.01); *F05D 2230/60* (2013.01); *F05D 2240/55* (2013.01); *F05D 2260/36* (2013.01)

(58) Field of Classification Search
CPC ...... F01D 11/005; F01D 11/003; F01D 11/08; F01D 11/006; F02C 7/28
See application file for complete search history.

(56) References Cited

U.S. PATENT DOCUMENTS

| 4,989,700 | A | 2/1991 | Popjoy |
| 6,196,790 | B1 | 3/2001 | Sheridan et al. |
| 9,850,771 | B2 * | 12/2017 | Porter ...................... F02C 3/04 |
| 2010/0111682 | A1 | 5/2010 | Scoggins et al. |
| 2016/0208923 | A1 | 7/2016 | Miller |
| 2016/0215638 | A1 | 7/2016 | Porter et al. |
| 2016/0215639 | A1 | 7/2016 | Porter et al. |
| 2016/0215702 | A1 | 7/2016 | Cherolis et al. |
| 2016/0369642 | A1 | 12/2016 | Himes |
| 2018/0080335 | A1 * | 3/2018 | Porter ...................... F02C 3/04 |

OTHER PUBLICATIONS

Extended European Search Report for European Application No. 18211987.5; Date of Completion: Apr. 4, 2019; dated Apr. 17, 2019; 7 Pages.

* cited by examiner

*Primary Examiner* — Eldon T Brockman
(74) *Attorney, Agent, or Firm* — Cantor Colburn LLP

(57) ABSTRACT

A face seal assembly includes a seal. The assembly also includes a seal carrier including a first seal wall, a second seal wall and a base seal wall, the first seal wall, the second seal wall and the base seal wall defining a groove for receiving the seal therein, the second seal wall extending radially outwardly to a non-uniform radial location.

13 Claims, 5 Drawing Sheets

SEAL RETENTION ASSEMBLY FOR GAS TURBINE ENGINE

BACKGROUND

Exemplary embodiments pertain to the art of gas turbine engines and, more particularly, to a seal retention assembly for a gas turbine engine.

Advanced high performance engines, such as those used in commercial jetliners, utilize main shaft bearing compartment seals to seal a main shaft bearing compartment and minimize lubricant from escaping the bearing compartment. Carbon seals are typically used for this purpose, and enable the engine and bearing compartment to function with minimal impact on the thrust specific fuel consumption, thermal management system, or the lubrication system.

Face seal assemblies in gas turbine engines often include a seal retaining feature that is integral to a seal carrier, but this adds mass to the carrier and can make separation requirements difficult. A higher mass requires heavier springs, which in turn amplifies wear rate and heat generation resultants. The challenge is to design a carrier that is lightweight, but strong enough to withstand the stresses of the interference fit of the carbon and avoid bending due to the applied spring load, and meet the fit requirements with the surrounding hardware.

BRIEF DESCRIPTION

Disclosed is a face seal assembly. The assembly includes a seal. The assembly also includes a seal carrier including a first seal wall, a second seal wall and a base seal wall, the first seal wall, the second seal wall and the base seal wall defining a groove for receiving the seal therein, the second seal wall extending radially outwardly to a non-uniform radial location.

In addition to one or more of the features described above, or as an alternative, further embodiments may include that the second seal wall includes a plurality of segments extending to a common, first radial location and a plurality of recessed portions extending to a second radial location that is radially inward of the first radial location.

In addition to one or more of the features described above, or as an alternative, further embodiments may include that each of the plurality of recessed portions extends circumferentially between an adjacent pair of the plurality of segments.

In addition to one or more of the features described above, or as an alternative, further embodiments may include that the groove is substantially U-shaped.

In addition to one or more of the features described above, or as an alternative, further embodiments may include that the face seal assembly is disposed in a gas turbine engine.

In addition to one or more of the features described above, or as an alternative, further embodiments may include that the face seal assembly is located adjacent a bearing compartment disposed proximate a main shaft assembly of the gas turbine engine.

In addition to one or more of the features described above, or as an alternative, further embodiments may include that the face seal assembly is located within the compressor section of the gas turbine engine.

Also disclosed is a gas turbine engine including a compressor section, a combustion section, a turbine section, a main shaft assembly, and a face seal assembly. The face seal assembly includes a seal. The face seal assembly also includes a seal carrier including a first seal wall, a second seal wall and a base seal wall, the first seal wall, the second seal wall and the base seal wall defining a groove for receiving the seal therein, the second seal wall extending radially outwardly to a non-uniform radial location.

In addition to one or more of the features described above, or as an alternative, further embodiments may include that the second seal wall includes a plurality of segments extending to a common, first radial location and a plurality of recessed portions extending to a second radial location that is radially inward of the first radial location.

In addition to one or more of the features described above, or as an alternative, further embodiments may include that each of the plurality of recessed portions extends circumferentially between an adjacent pair of the plurality of segments.

In addition to one or more of the features described above, or as an alternative, further embodiments may include that the groove is substantially U-shaped.

In addition to one or more of the features described above, or as an alternative, further embodiments may include that the face seal assembly is located adjacent a bearing compartment disposed proximate a main shaft of the gas turbine engine.

In addition to one or more of the features described above, or as an alternative, further embodiments may include that the face seal assembly is located within the compressor section.

Further disclosed is a method of assembling a face seal assembly in a gas turbine engine. The method includes disposing at least one seal segment within a groove defined by a first seal wall, a second seal wall and a seal base wall, the second seal wall extending radially outwardly to a non-uniform radial location.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
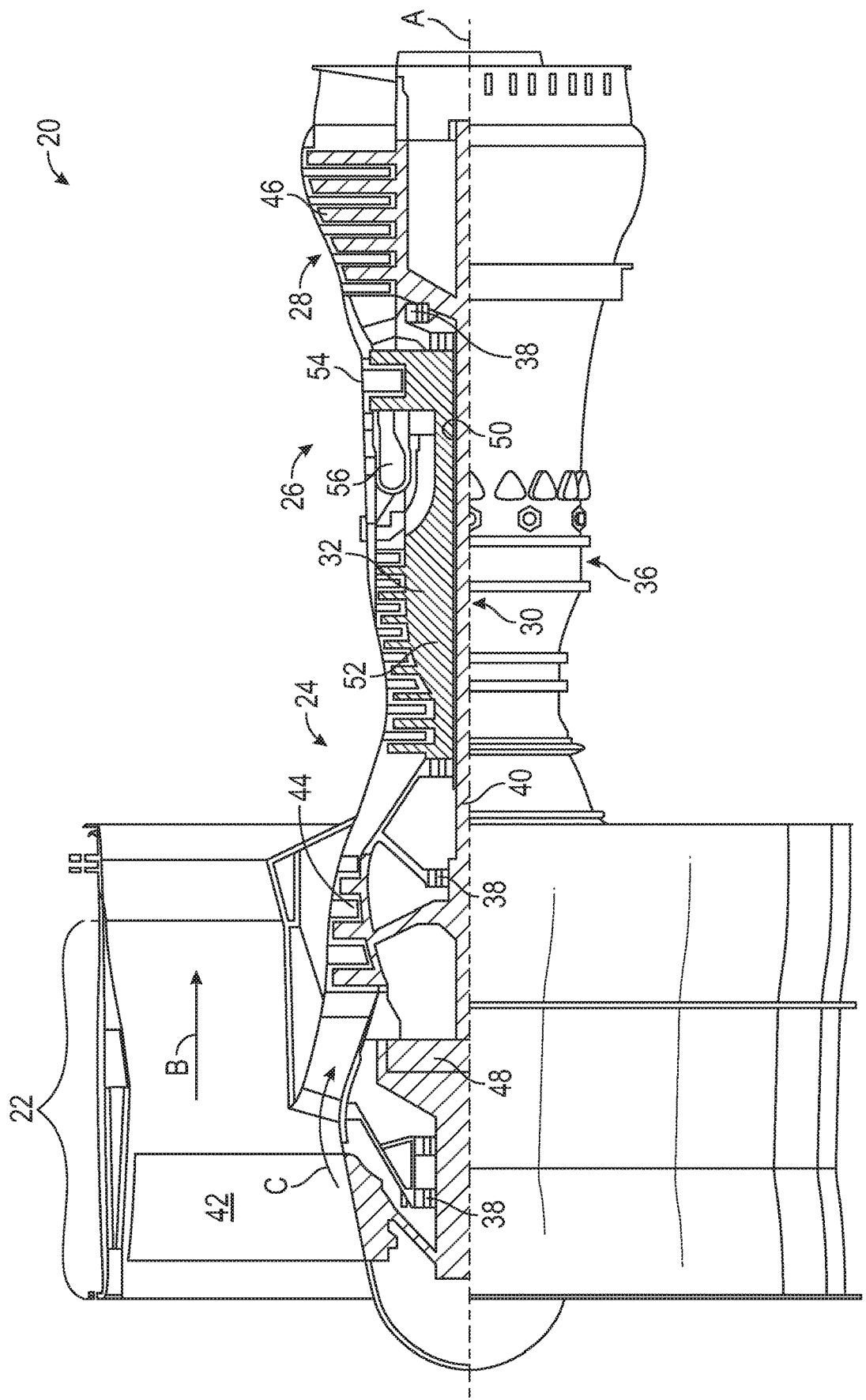
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
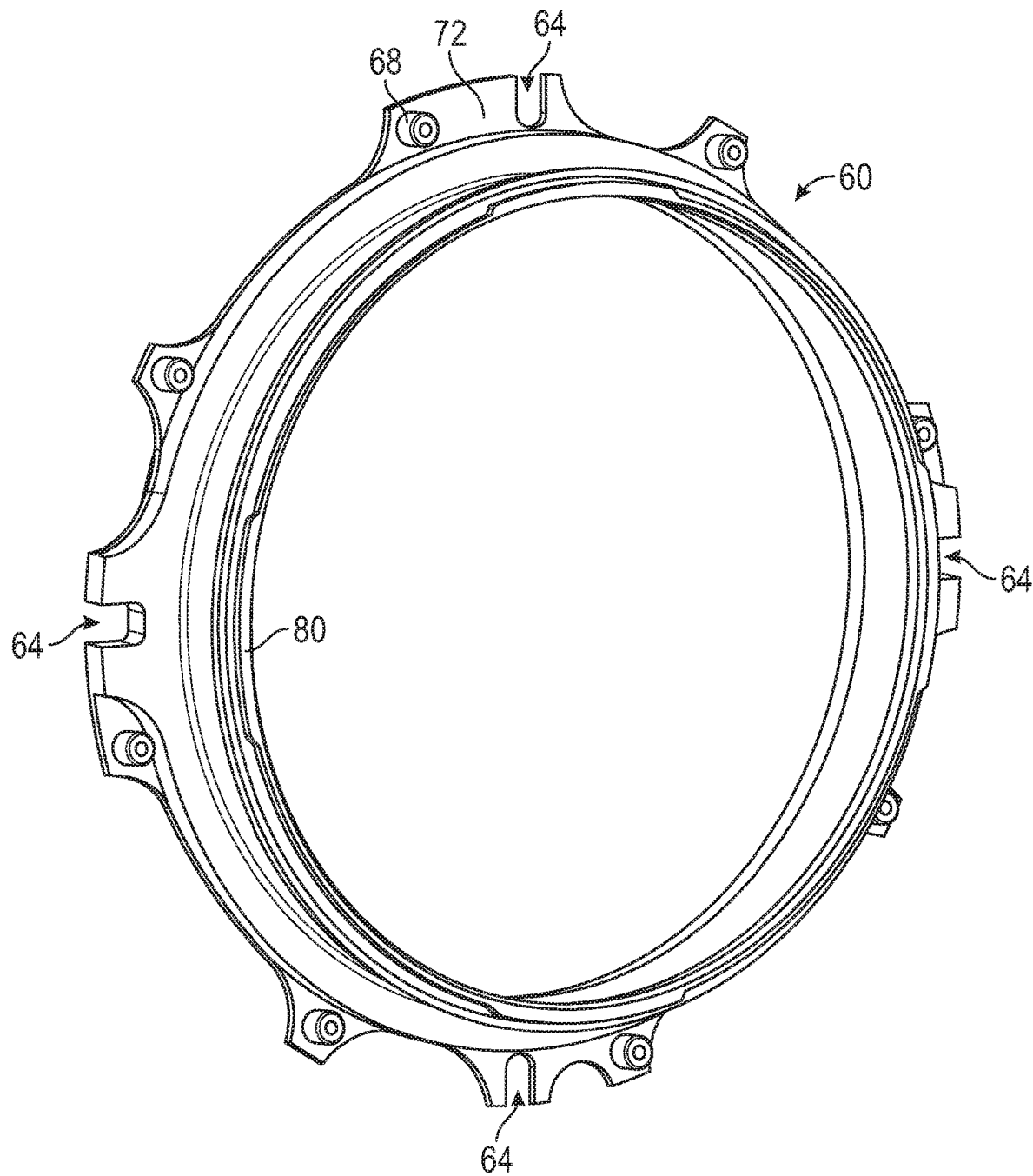
FIG. 2 is a perspective view of a seal carrier.
Figure 5:
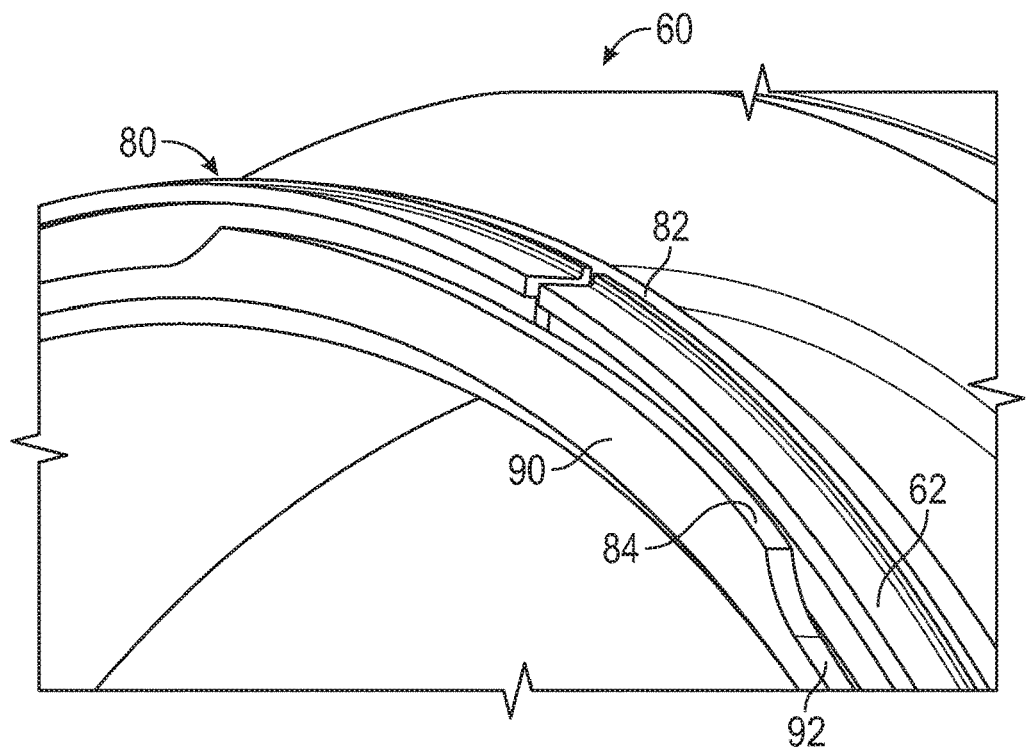
FIG. 5 is a perspective view of a portion of the seal carrier with a seal installed therein.
Figure 6:
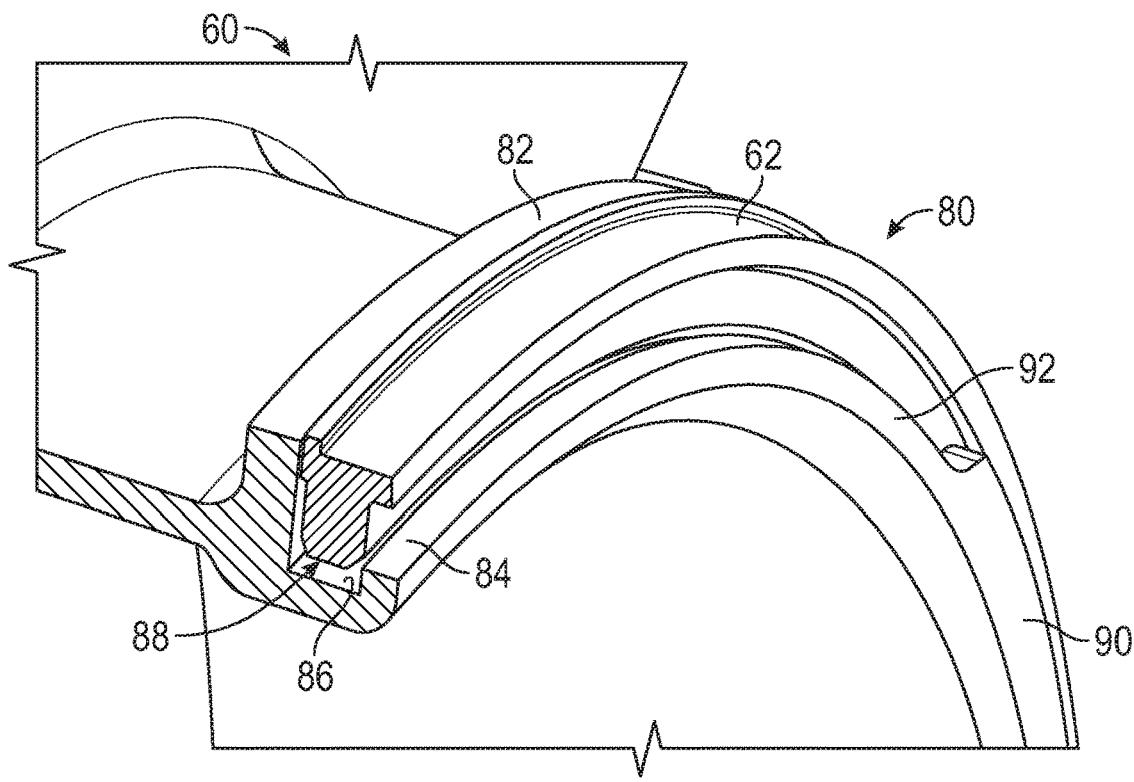
FIG. 6 is a perspective view of a portion of the seal carrier with the seal installed therein.
Figure 7:
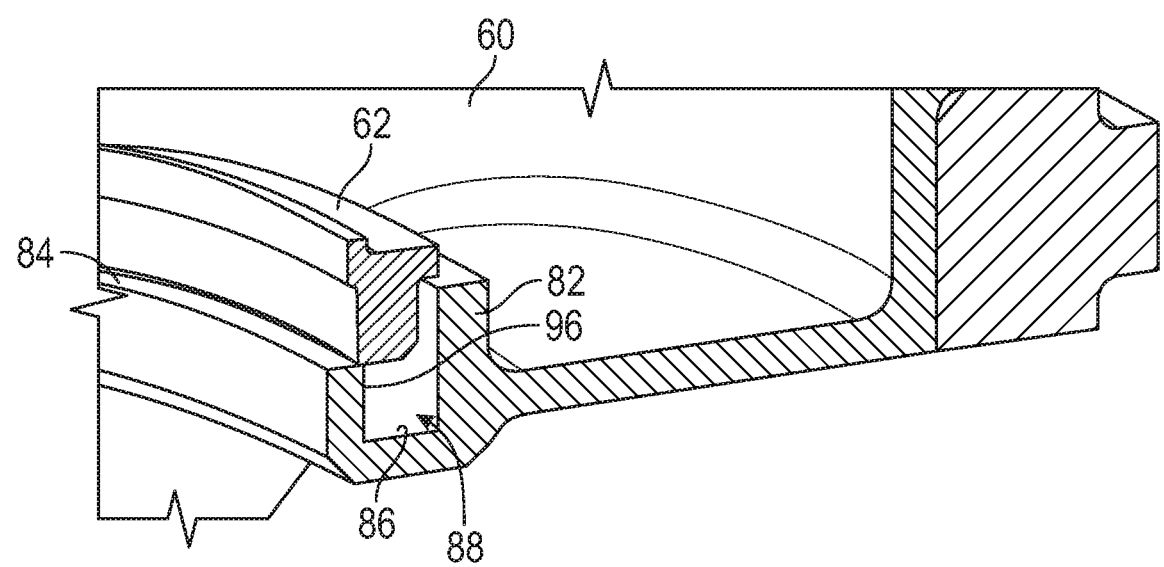
FIG. 7 is a perspective view of an attempt to install the seal within the seal carrier in an incorrect orientation.

Referring now to FIG. 2, illustrated is a seal carrier 60 that is part of a face seal arrangement. The face seal arrangement may be located at various contemplated locations within the gas turbine engine 10. In some embodiments, the face seal arrangement is located proximate the above-described bearing systems 38 to seal a bearing compartment. The face seal arrangement includes a housing (not shown) surrounding the seal carrier. Disposed within the seal carrier 60 is a seal 62, as shown in FIGS. 5-7 and described in detail herein. The seal 62 is substantially circular in cross-section. The seal carrier 60 is prevented from rotating about the engine centerline axis A via at least one anti-rotation pin assemblies (not shown) that interface with the seal carrier 60. In particular, an anti-rotation pin is positioned in a corresponding anti-rotation slot 64 of the seal carrier 60. In the illustrated embodiments, four anti-rotation slots 64 are provided, but it is to be understood that different embodiments may include greater or fewer slots.

The seal carrier 60 is positioned axially relative to the housing using multiple springs (not shown). The springs are spaced circumferentially about the seal carrier 60 and interfaces with the seal carrier 60 via multiple spring fastener features 68. The springs provide axial loading to maintain contact between the seal 60 and a rotating seal plate that is part of the spool or shaft assembly.

Figure 3:
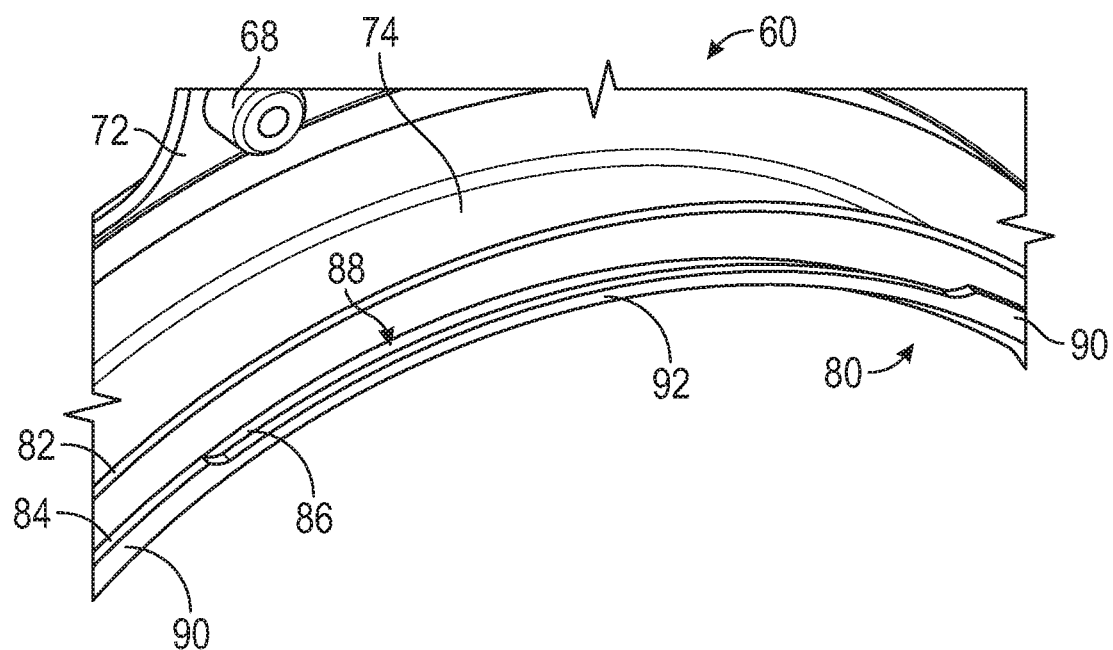
FIG. 3 is a perspective view of a portion of the seal carrier.
Figure 4:
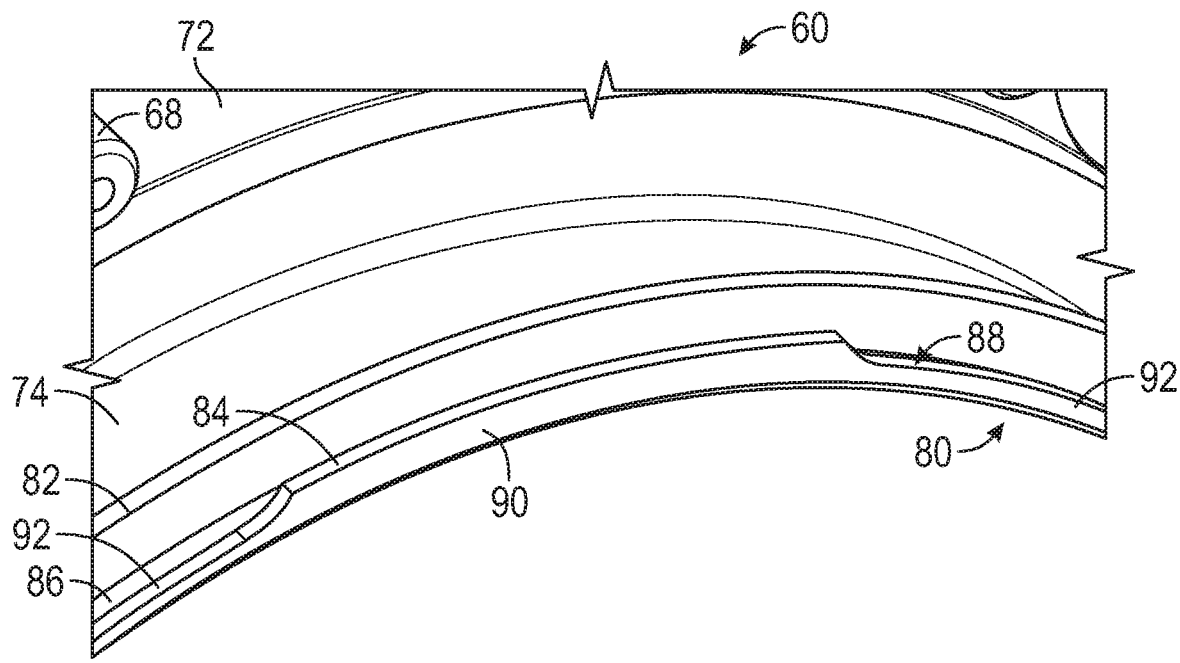
FIG. 4 is a perspective view of a portion of the seal carrier.

Referring now to FIGS. 2-6, the seal carrier 60 and the seal 62 are shown with various views. FIGS. 2-4 illustrate the seal carrier 60 and FIGS. 5 and 6 illustrate the seal 62 installed within a groove of the seal carrier 60. The seal carrier 60 includes a main plate portion 72 that defines the anti-rotation slots 64 and provide flanges for attachment of the spring fastener features 68. The seal carrier 60 also includes a cylindrical body 74 extending away from the main plate portion 72.

At an end of the cylindrical body 74 distal from the main plate portion 72 is a seal retention structure 80 for installation of the seal 62. The seal retention structure 80 includes a first wall 82, a second wall 84 and a base wall 86. The first wall 82, the second wall 84 and the base wall 86 define a cylindrical groove 88 that is configured to receive and retain the seal 62. In the illustrated embodiment, the groove 88 is substantially U-shaped when taken at a circumferential section location of the seal carrier 60.

The second seal wall 84 extends radially away from the base wall 86, but not to a constant radial distance. In particular, the second seal wall 84 includes a plurality of segments 90 that extend to a maximum radius, the plurality of segments 90 having constant radial lengths. In other words, the plurality of segments 90 extend to a common radius. Located between, in a circumferential direction, the plurality of segments 90 are a plurality of recessed portions 92 of the wall that do not extend as far in the radial direction as the plurality of segments 90. The shape and contour of the recessed portions 92 may vary from the example shown in the illustrated embodiments. The positioning of the plurality of segments 90 and recessed portions 92 define a second seal wall that extends to a non-uniform radial location.

Avoiding a constant radius ring for the second seal wall 84 provides numerous benefits. For example, the weight and moment of inertia of the seal carrier 60 are reduced. A higher mass for a seal carrier requires heavier spring loads during operation to avoid any seal separation during operation. Higher spring loads consequently increases the friction generated at the rubbing interface, resulting in higher heat generation and accelerating seal wear over time, in addition to a higher oil flow requirement to mitigate this extra heat generation. Reducing the mass of the second seal wall 84 allows mitigation of these issues without having to make more challenging modifications. Therefore, high quality performance is maintained, while improving issues associated with seal wear.

Referring now to FIG. 7, features that assist with installation of the seal 62 within the groove 88 of the seal carrier 60 are illustrated. In particular, the geometry of the seal 62 only allows the seal 62 to be installed in a single, correct orientation, such as the orientation shown in FIGS. 5 and 6. The correct orientation allows the seal 62 to be inserted into the groove 88 with a slightly clearance between the second seal wall 84 and the seal 62 (FIGS. 5 and 6). In the illustration of FIG. 7, the seal 62 is shown during an attempt to install the seal 62 backwards. Attempting to install the seal 62 in this manner—or any other incorrect orientation— results in an interference condition that prevents full insertion of the seal 62 into the groove 88. Specifically, the inner side 96 of the second seal wall 84 and the seal 62 clash prior to full installation of the seal 62. Installation reliability is therefore improved with the installation features described above.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A face seal assembly comprising:
   a seal; and
   a seal carrier, the seal carrier including:
   a main plate portion that defines anti-rotation slots and provides flanges for attachment of spring fastener features;
   a cylindrical body extending away from the main plate portion; and
   a seal retention structure, the seal retention structure at an end of the cylindrical body distal from the main plate portion and including; a first seal wall, a second seal wall and a base seal wall, the first seal wall, the second seal wall and the base seal wall defining a groove for receiving the seal therein, the second seal wall extending radially outwardly to a non-uniform radial location, wherein the second seal wall includes a plurality of segments extending to a common, first radial location and a plurality of recessed portions extending to a second radial location that is radially inward of the first radial location and each of the plurality of recessed portions extends circumferentially between an adjacent pair of the plurality of segments.

2. The face seal assembly of claim 1, wherein the geometry of the seal only allows the seal to be installed into the groove with a single orientation.

3. The face seal assembly of claim 1, wherein the groove is substantially U-shaped.

4. The face seal assembly of claim 1, wherein the face seal assembly is disposed in a gas turbine engine.

5. The face seal assembly of claim 4, wherein the face seal assembly is located adjacent a bearing compartment disposed proximate a main shaft assembly of the gas turbine engine.

6. The face seal assembly of claim 4, wherein the face seal assembly is located within the compressor section of the gas turbine engine.

7. A gas turbine engine comprising:
   a compressor section;
   a combustion section;
   a turbine section;
   a main shaft assembly; and
   a face seal assembly comprising:
   a seal; and
   a seal carrier, the seal carrier including:
   a main plate portion that defines anti-rotation slots and provides flanges for attachment of spring fastener features;
   a cylindrical body extending away from the main plate portion; and
   a seal retention structure, the seal retention structure at an end of the cylindrical body distal from the main plate portion and including; a first seal wall, a second seal wall and a base seal wall, the first seal wall, the second seal wall and the base seal wall defining a groove for receiving the seal therein, the second seal wall extending radially outwardly to a non-uniform radial location, wherein the second seal wall includes a plurality of segments extending to a common, first radial location and a plurality of recessed portions extending to a second radial location that is radially inward of the first radial location and each of the plurality of recessed portions extends circumferentially between an adjacent pair of the plurality of segments.

8. The gas turbine engine of claim 7, wherein the geometry of the seal only allows the seal to be installed into the groove with a single orientation.

9. The gas turbine engine of claim 7, wherein the groove is substantially U-shaped.

10. The face seal assembly of claim 7, wherein the face seal assembly is located adjacent a bearing compartment disposed proximate a main shaft of the gas turbine engine.

11. The face seal assembly of claim 7, wherein the face seal assembly is located within the compressor section.

12. A method of assembling a face seal assembly in a gas turbine engine, the method comprising:
   providing a seal carrier, the seal carrier including: a main plate portion that defines anti-rotation slots and provides flanges for attachment of spring fastener features; a cylindrical body extending away from the main plate portion; and a seal retention structure, the seal retention structure at an end of the cylindrical body distal from the main plate portion and including; a first seal wall, a second seal wall and a base seal wall, the first seal wall, the second seal wall and the base seal wall defining a groove, the second seal wall extending radially outwardly to a non-uniform radial location, wherein the second seal wall includes a plurality of segments extending to a common, first radial location and a plurality of recessed portions extending to a second radial location that is radially inward of the first radial location and each of the plurality of recessed portions extends circumferentially between an adjacent pair of the plurality of segments; and
   providing at least one seal segment configured to be disposed within the groove defined.

13. The method as in claim 12, wherein the geometry of the at least one seal segment only allows the at least one seal segment to be installed into the groove with a single orientation.

* * * * *